(12) United States Patent
Komatsubara et al.

(10) Patent No.: US 9,913,458 B2
(45) Date of Patent: Mar. 13, 2018

(54) ABSORBENT ARTICLE FOR PET

(75) Inventors: Daisuke Komatsubara, Kagawa (JP); Takeshi Ikegami, Kagawa (JP)

(73) Assignee: Unicharm Corporation, Ehime (JP)

( * ) Notice: Subject to any disclaimer, the term of this patent is extended or adjusted under 35 U.S.C. 154(b) by 164 days.

(21) Appl. No.: 14/007,617

(22) PCT Filed: Mar. 13, 2012

(86) PCT No.: PCT/JP2012/056473
§ 371 (c)(1),
(2), (4) Date: Nov. 27, 2013

(87) PCT Pub. No.: WO2012/132891
PCT Pub. Date: Oct. 4, 2012

(65) Prior Publication Data
US 2014/0076245 A1    Mar. 20, 2014

(30) Foreign Application Priority Data

Mar. 30, 2011  (JP) .................................. 2011-075848

(51) Int. Cl.
*A01K 23/00*    (2006.01)

(52) U.S. Cl.
CPC .................................. *A01K 23/00* (2013.01)

(58) Field of Classification Search
CPC .... A01K 13/006; A01K 23/00; A01K 23/005; A61F 2013/15186; A61F 13/15585; A61F 13/5622; A61F 13/62

(Continued)

(56) References Cited

U.S. PATENT DOCUMENTS 4,770,298 A * 9/1988 McFarland .......... A61F 5/4401
                                                            206/390
4,966,286 A * 10/1990 Muckenfuhs ...... B65D 75/5833
                                                            206/440

(Continued)

FOREIGN PATENT DOCUMENTS

DE         3132671 A1    9/1980
JP      2004-159592 A    6/2004
(Continued)

OTHER PUBLICATIONS

European Search Report from corresponding European application No. 12765631.2 dated Sep. 4, 2014 (7 pgs).

(Continued)

*Primary Examiner* — Monica L Williams
(74) *Attorney, Agent, or Firm* — Brinks Gilson & Lione

(57) ABSTRACT

An absorbent article for pets includes a front surface layer, a back surface layer, and an absorbent body, and is formed in a rectangular shape having a first end portion, a second end portion, and a pair of side portions. The first end portion is arranged on the body of the pet, and the second end portion side is detachably attached to the outer surface of the first end portion when worn. The absorbent article further includes an engaging member arranged on the outer surface side of the first end portion, and is engageable with the inner surface of the second end portion. A part of the outer surface of the back surface layer is formed from a member engageable with the engaging member. A low rigidity area is formed towards the second end portion side of the section on the first end portion where the engaging member is arranged.

14 Claims, 18 Drawing Sheets

(58) Field of Classification Search
USPC ............... 119/867, 868, 850, 856; 604/358,
604/385.01, 385.11, 385.201, 385.23,
604/385.24, 386, 387, 389, 391
See application file for complete search history.

(56) References Cited

U.S. PATENT DOCUMENTS

| | | | | |
|---|---|---|---|---|
| 5,137,508 | A * | 8/1992 | Engman | ............... A61D 9/00 |
| | | | | 119/850 |
| 5,275,588 | A * | 1/1994 | Matsumoto | ............ A61F 13/58 |
| | | | | 604/358 |
| 6,710,221 | B1 * | 3/2004 | Pierce | .................. A61F 13/42 |
| | | | | 604/361 |
| 2003/0069555 | A1 * | 4/2003 | Erdman | ............ A61F 13/49011 |
| | | | | 604/369 |
| 2007/0129702 | A1 | 6/2007 | Gribben | |
| 2010/0094235 | A1 * | 4/2010 | Solomon | ............... A01K 23/00 |
| | | | | 604/359 |
| 2010/0319633 | A1 | 12/2010 | Moncheski | |
| 2011/0209675 | A1 | 9/2011 | Esperon | |

FOREIGN PATENT DOCUMENTS

| | | |
|---|---|---|
| JP | 2005-229915 A | 9/2005 |
| JP | 2007-20533 A | 2/2007 |
| JP | 3141580 | 4/2008 |

OTHER PUBLICATIONS

International Search Report from corresponding PCT application No. PCT/JP2012/056473 dated May 15, 2012 (4 pgs).

* cited by examiner

ABSORBENT ARTICLE FOR PET

RELATED APPLICATION

This application is a 35 U.S.C. § 371 national phase filing of International Patent Application No. PCT/JP2012/056473 filed Mar. 13, 2012, to which priority is claimed under 35 U.S.C. § 120 and through which priority is claimed under 35 U.S.C. § 119 to Japanese Patent Application No. 2011-075848, filed Mar. 30, 2011.

TECHNICAL FIELD

The present invention relates to an absorbent article for pet, which is used in a state of being wrapped around the waist of a pet such as a dog or cat.

BACKGROUND ART

Heretofore, a disposable diaper for pet used for a pet such as a dog or cat has been proposed. Such a disposable diaper for pet catches feces and urine of the pet by covering the anus and the urethral opening positioned in the crotch between the hind legs when worn.

Some pets (for example a miniature dachshund) have the urethral opening more in front than a position in the crotch between the hind legs. In addition, male dogs have the urethral opening more in front than female dogs. If the disposable diaper for pet is used for pets having the urethral opening more in front, the urethral opening may not be covered by the diaper, and urine may leak.

Given this, there has been proposed an absorbent article for pet, which includes a top surface layer, a back surface layer, and an absorbent core positioned between the top surface layer and the back surface layer, and which is configured in a rectangular shape and worn in a state of being wrapped around the pet's waist (for example, see Patent Document 1).

Such an absorbent article for pet configured in a rectangular shape can assuredly cover the urethral opening, regardless of position of the urethral opening.

Patent Document 1: Japanese Unexamined Patent Application Publication No. 2007-20533

DISCLOSURE OF THE INVENTION

Problems to be Solved by the Invention

After using the absorbent article for pet configured in a rectangular shape, the absorbent article is discarded in a state where the surface with attached waste is not exposed, such that the front surface layer side with attached waste such as feces or urine is inward, by folding up the absorbent article in a longitudinal direction many times into a compact shape, or by wrapping up the absorbent article in the longitudinal direction into a small size.

However, the shape of the absorbent article for pet disclosed in Patent Document 1 cannot be fixed in a state of being folded up or wrapped up.

With regard to absorbent articles such as a disposable diaper for infants, there has been proposed a technique of providing a tape member in which shape is fixed in a state of being folded up or wrapped up such that the front surface layer side is inward. However, in this case, since a new member is separately required in manufacturing the absorbent article, the cost of the absorbent article is increased.

Therefore, an object of the present invention is to provide an absorbent article for pet, which can maintain a state of being folded up or wrapped up in a longitudinal direction such that a front surface layer side is inward, without newly providing a separate member.

Means for Solving the Problems

The present invention relates to an absorbent article for pet, including: a liquid permeable top surface layer; a liquid impermeable back surface layer; and an absorbent core positioned between the top surface layer and the back surface layer; in which the absorbent article for pet is configured in a rectangular shape having a first end portion and a second end portion opposed to each other, and a pair of side portions opposed to each other and orthogonal to the first end portion and the second end portion, and in a state of being wrapped around a pet's waist, the first end portion is arranged on a side to the pet's body, and the second end portion is removably attached to an outer surface of the first end portion. The absorbent article for pet further includes a locking member arranged on an outer surface side of the first end portion and capable of locking an inner surface of the second end portion, in which at least a part of an outer surface of the back surface layer is constituted of a member that can be locked by the locking member, and in which a low rigidity area is formed on a second end portion side in a portion in which the locking member is arranged in the first end portion, with rigidity of the low rigidity area being lower than that of the portion in which the locking member is arranged.

The locking member is preferably configured in a belt-like shape, and to be arranged such that a longitudinal direction of the locking member is along a width direction of the absorbent article for pet.

The first end portion is preferably configured by extending the top surface layer and the back surface layer from an edge of the absorbent core; and in which the low rigidity area is constituted of a portion in which the top surface layer and the back surface layer extend from the edge of the absorbent core.

The length of the low rigidity area along a longitudinal direction of the absorbent article for pet is preferably greater than the length of the locking member along the longitudinal direction of the absorbent article for pet.

The locking member is preferably constituted of a hook tape having a plurality of hook members; and in which the outer surface of the back surface layer is constituted of a nonwoven fabric with which the plurality of hook members can be engaged.

The top surface layer is preferably constituted of a nonwoven fabric with which the plurality of hook members can be engaged.

Effects of the Invention

According to the absorbent article for pet of the present invention, it is possible to maintain a state in which the article is folded up or wrapped up in a longitudinal direction such that a front surface layer side is inward, without newly providing a separate member.

Figure 1:
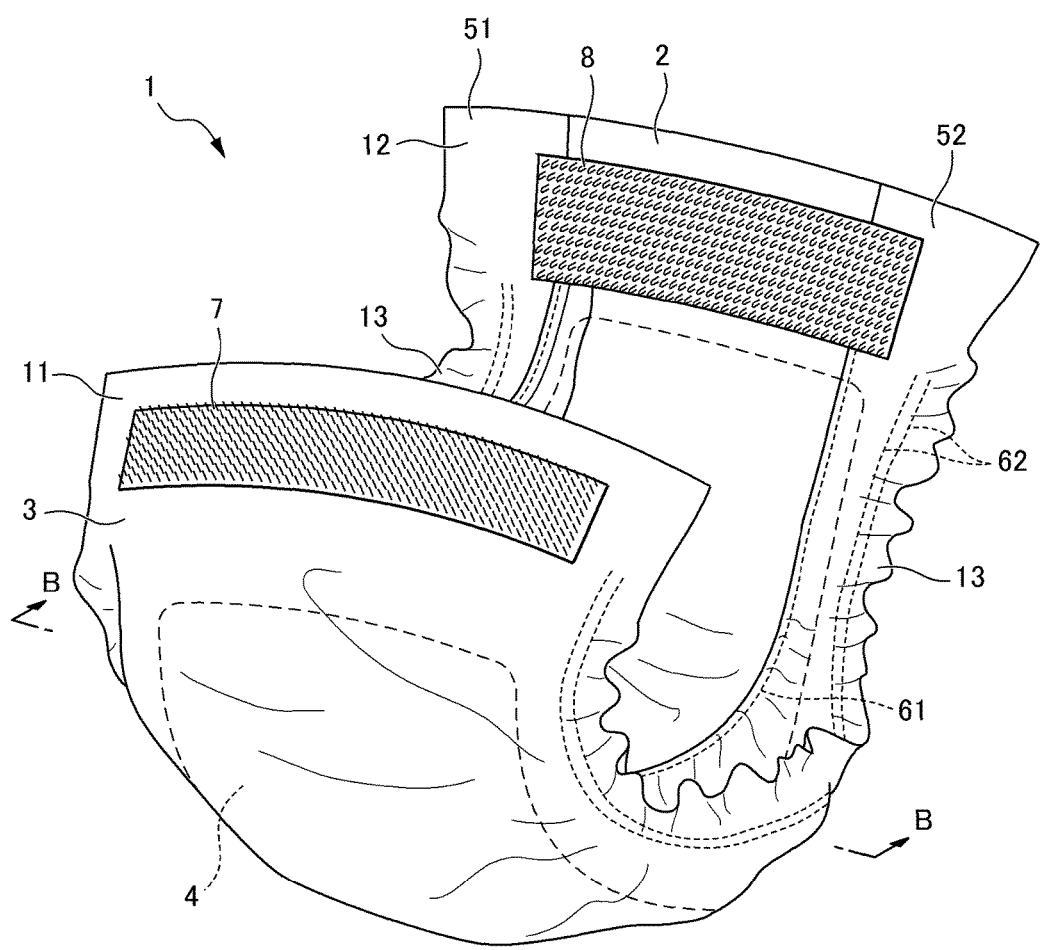
FIG. 1 is a perspective view showing an absorbent article for pet according to a first embodiment of the present invention.

DESCRIPTION OF REFERENCE NUMERALS 1 absorbent article for pet
2 top sheet (top surface layer)
3 back surface layer
4 absorbent core
7 hook tape (locking member)
11 first end portion
12 the second end portion
16 low rigidity area

PREFERRED MODE FOR CARRYING OUT THE INVENTION

Embodiments of the absorbent article for pet according to the present invention will be described hereinafter with reference to the drawings.

First, the absorbent article for pet according to the first embodiment will be described hereinafter with reference to FIGS. 1 to 6.

Figure 2:
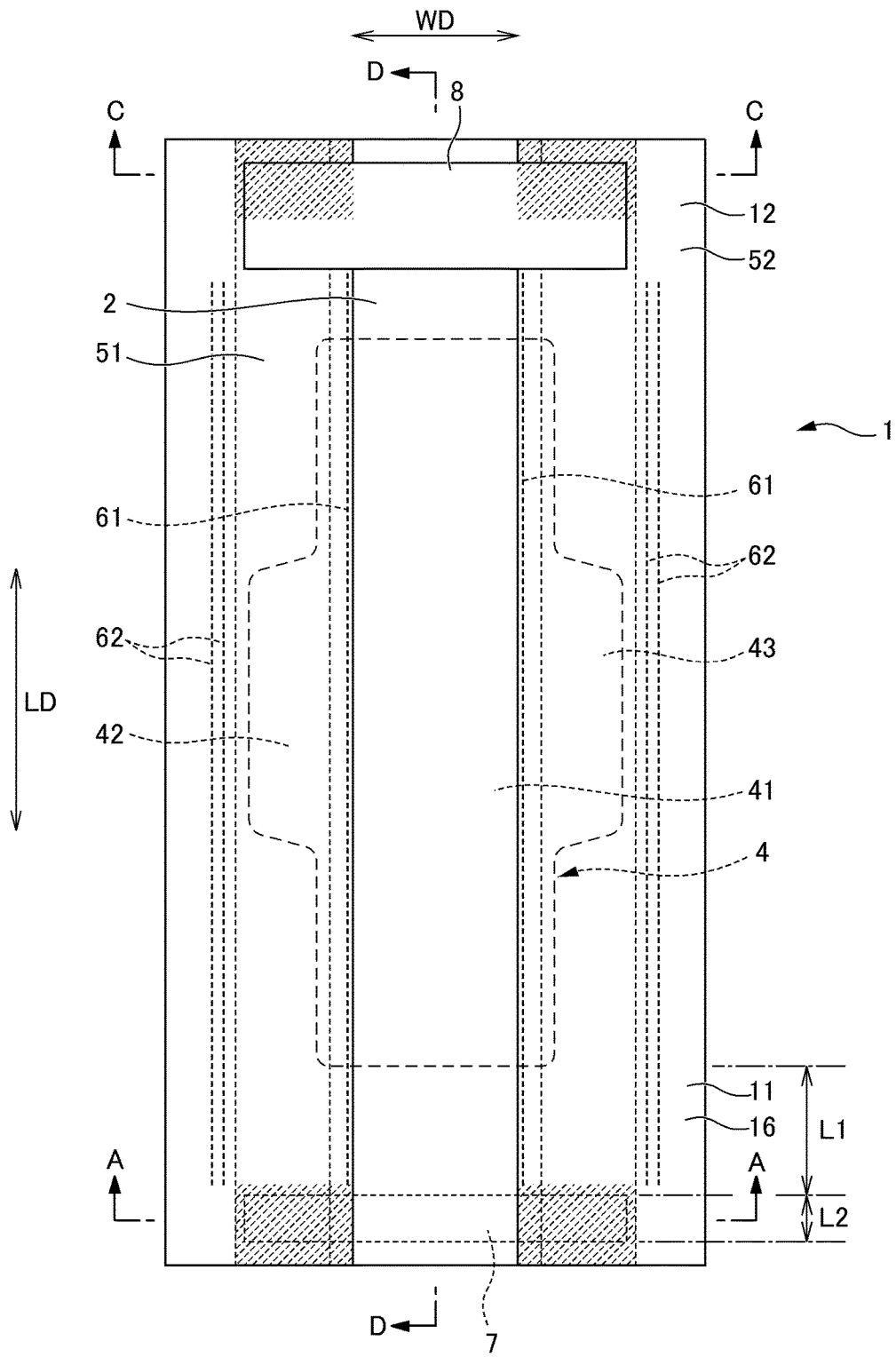
FIG. 2 is a plan view of the absorbent article for pet according to the first embodiment viewed from a top surface layer side.

As shown in FIGS. 1 and 2, an absorbent article for pet 1 according to the first embodiment is configured in a rectangular shape with a first end portion 11 and a second end portion 12 as a pair of end portions facing each other, and a pair of side portions facing each other orthogonally to the first end portion 11 and the second end portion 12, the absorbent article for pet 1 being worn in a state of being wrapped around the pet's waist. The absorbent article for pet 1 is especially preferably used for a pet having the urethral opening located further toward the front than the crotch between the hind legs (such as for a miniature dachshund).

The absorbent article for pet 1 includes, as shown in FIGS. 1 to 6: a top sheet 2 constituting a liquid permeable top surface layer; a back sheet 31 and a waterproof sheet 32 constituting a liquid impermeable back surface layer 3; an absorbent core 4; a pair of side sheets 51, 52; first elastic members 61 and second elastic members 62 as elastic members; a hook tape 7 as a locking member; and a loop member 8 that can be engaged with the hook tape 7.

The top sheet 2 is configured in a rectangular shape. The top sheet 2 mainly composes a surface of a side in contact with the pet's body. As the top sheet 2, a perforated or non-perforated nonwoven fabric or a porous plastic sheet can be used.

Figure 3:
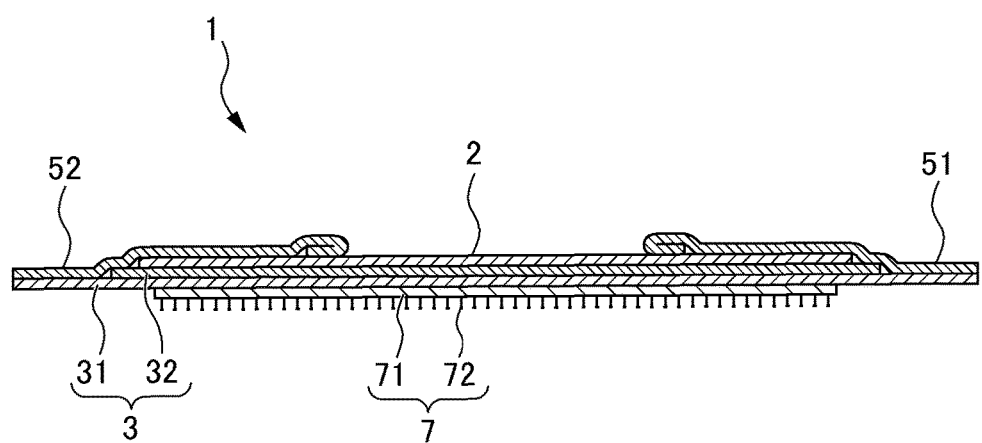
FIG. 3 is a cross-sectional view taken along the line A-A of FIG. 2.
Figure 4:
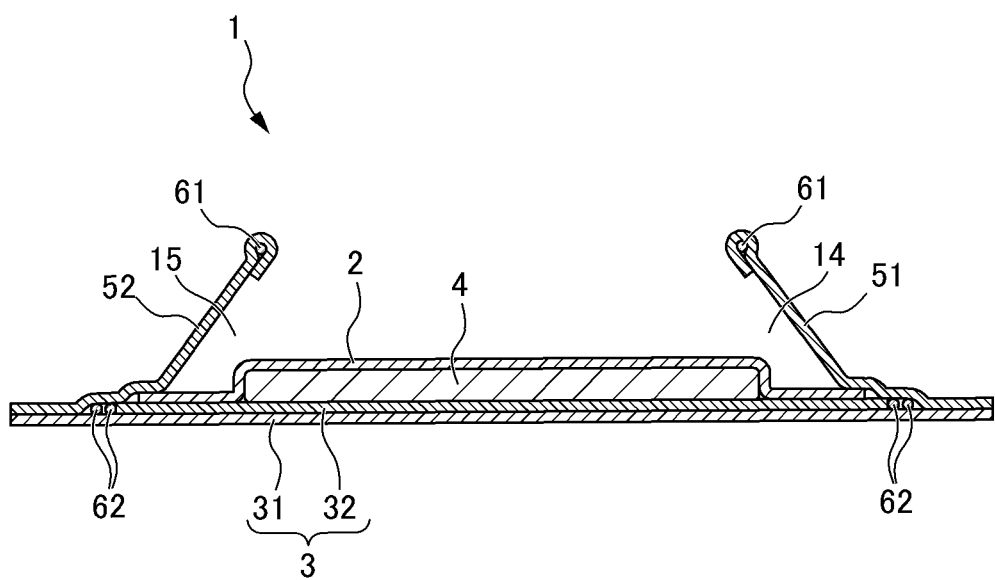
FIG. 4 is a cross-sectional view taken along the line B-B of FIG. 1.
Figure 5:
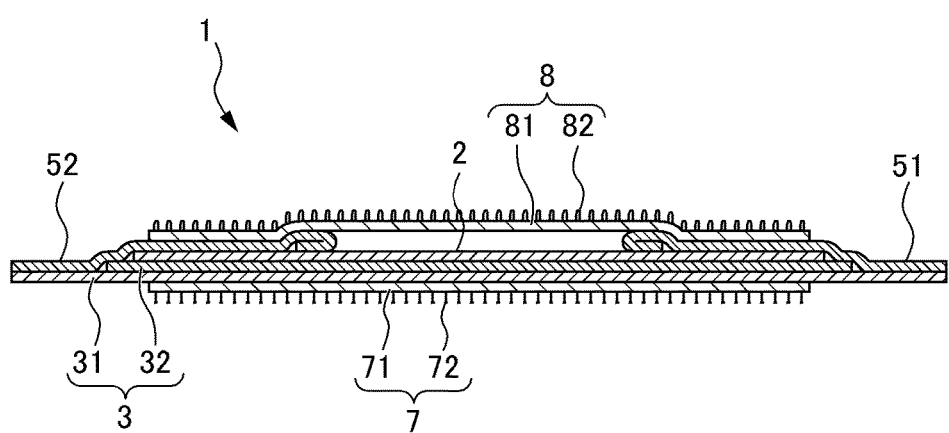
FIG. 5 is a cross-sectional view taken along the line C-C of FIG. 2.

The back sheet 31 is configured in a rectangular shape that is wider than, and has substantially the same length as, the top sheet 2, as shown in FIGS. 3 to 5. The back sheet 31 composes a surface of the absorbent article for pet 1, on a side not in contact with the pet's body.

The waterproof sheet 32 is configured to be smaller in width than the back sheet 31 and greater in width than the top sheet 2 and is arranged on a top sheet 2 side of the back sheet 31.

As the back sheet 31 and the waterproof sheet 32, a hydrophobic nonwoven fabric, a liquid impermeable plastic film, a laminated sheet made of the nonwoven fabric and the liquid impermeable plastic film, an SMS nonwoven fabric made by sandwiching a high-water resistance melt-blown nonwoven fabric with a high-strength spun-bond nonwoven fabric, and the like can be used.

In the first embodiment, an outer surface of the back sheet 31 is constituted of a nonwoven fabric with which a hook portion 72 (to be described later) can be engaged.

The pair of side sheets 51, 52 are configured in an elongated rectangular shape as shown in FIG. 2 and arranged on respective side portions along the longitudinal direction of a body side of the top sheet 2. The pair of side sheets 51, 52 is configured to have substantially the same length as the top sheet 2 and the back sheet 31. As shown in FIGS. 3 to 5, outer edges of the pair of side sheets 51, 52 correspond to side edges of the back sheet 31. The outer edges of the pair of side sheets 51, 52 are joined to the side edges of the back sheet 31.

A part of the inner edges of the pair of side sheets 51, 52 is a free-end, as shown in FIGS. 1 and 4. More specifically, the inner edges of the pair of side sheets 51, 52 are joined to the top sheet 2 in the first end portion 11 and the second end portion 12 as shown in FIGS. 3 and 5. The inner edges of the pair of side sheets 51, 52 are free ends in portions other than the first end portion 11 and the second end portion 12, as shown in FIG. 4.

As the side sheets 51, 52, a water repellent or hydrophobic sheet is preferably used. More specifically, various nonwoven fabrics such as spun lace nonwoven fabric, spun bond nonwoven fabric, thermal bond nonwoven fabric, meltblown nonwoven fabric, needle-punched nonwoven fabric, air-through nonwoven fabric and the like can be used. As the fiber composing the nonwoven fabric, synthetic fiber of olefin, polyester, polyamide and the like such as polyethylene and polypropylene; regenerated fiber such as rayon and cupra; and natural fiber such as cotton can be used.

The absorbent core 4 is arranged between the top sheet 2 and the back surface layer 3 that are layered, as shown in FIG. 4. The absorbent core 4 includes a rectangular belt shaped absorbent core main body 41, a first extension portion 42 and a second extension portion 43 extending from the absorbent core main body 41, as shown in FIG. 2.

The absorbent core main body 41 is arranged to extend from one end portion side to the other end portion side of the absorbent article for pet 1 in the longitudinal direction LD.

Figure 6:
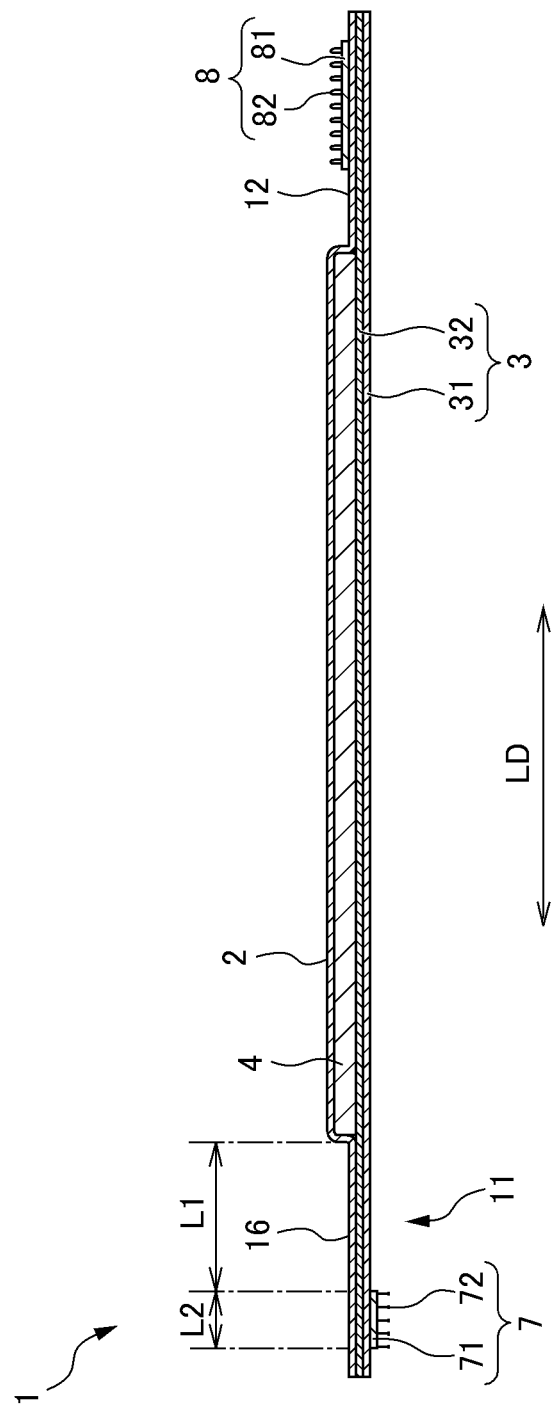
FIG. 6 is a cross-sectional view taken along the line D-D of FIG. 2.

The absorbent core main body 41 is configured to be smaller in length than the top sheet 2 and the back sheet 3. As shown in FIG. 6, the absorbent core main body 41 is not arranged in the first end portion 11 and the second end portion 12 of the absorbent article for pet 1.

Width of the absorbent core main body 41 is configured to be smaller than width of the top sheet 2 and the back sheet. A pair of side portions along the longitudinal direction of the absorbent core main body 41 is positioned more outward in the width direction WD of the absorbent article for pet 1 than the inner edges in the vicinity of the inner edges of the side sheet 51 in a plan view as shown in FIG. 2.

The first extension portion 42 and the second extension portion 43 respectively extend outward in the width direction from a central portion of the pair of side portions along the longitudinal direction of the absorbent core main body 41.

The first elastic member 61 is arranged in the vicinity of the inner edge of each of the pair of side sheets 51, 52, as shown in FIGS. 1 and 2. More specifically, the first elastic member 61 is sandwiched by the side sheet that is folded back from the inner edge side and fixed to the side sheet by a hotmelt adhesive in an extended state as shown in FIG. 4. The first elastic member 61 is, in the extended state, greater in length than the absorbent core 4 in the longitudinal direction and is arranged on the pair of side sheets 51, 52 as shown in FIG. 2.

The second elastic members 62 are arranged in each of the pair of side portions of the absorbent article for pet 1, as shown in FIGS. 1 and 2. More specifically, each second elastic member 62 is arranged between the side sheet 51 and the back sheet 31, and between the side sheet 52 and the back sheet 31, respectively, as shown in FIG. 4. The second elastic members 62 are fixed to the side sheets 51, 52 and the back sheet 31 by a hotmelt adhesive.

The second elastic members 62 are, in the extended state, greater in length than the absorbent core 4 in the longitudinal direction, and are arranged on each of the pair of side portions along the longitudinal direction LD of the absorbent article for pet 1.

As the first elastic member 61 and the second elastic members 62, any material that is elongated and stretchable can be used, for example: natural rubber such as filiform rubber and flat rubber; thermoplastic elastomer such as urethane, ethylene-vinyl acetate copolymer (EVA), and PE. More specifically, as the thermoplastic elastomer, polybutadiene, polyisoprene, styrene-butadiene copolymer, styrene-isoprene copolymer, polyurethane, ethylene-vinyl acetate copolymer, ethylene-α-olefin copolymer and the like that are processed to be filiform or formed in a film and then slitted into thin strips may be cited.

The hook tape 7 is arranged on an outer surface of the first end portion 11 as shown in FIGS. 1 and 2. The hook tape 7 is configured in a belt-like shape and arranged such that the longitudinal direction of the hook tape 7 is along the width direction WD of the absorbent article for pet 1. It is preferable for the hook tape 7 to be attached at a position within a predetermined distance from the edge of the first end portion 11.

As shown in FIG. 3, the hook tape 7 includes a belt-shaped base portion 71 and a plurality of hook portions 72 provided on one face of the base portion 71. The hook tape 7 is attached to the back sheet 31 such that the surface, on which the plurality of hook portions 72 are formed, is directed outward.

In the hook tape 7, the base portion 71 and the plurality of hook portions 72 are integrally formed with a synthetic resin material such as polypropylene.

In this regard, the first end portion 11 is configured by extending the top sheet 2, the side sheets 51, 52 and the back surface layer 3 from one end side of the absorbent core 4 in the longitudinal direction. In other words, the absorbent core 4 is not arranged in the first end portion 11; and the first end portion 11 is configured by laminating the top sheet 2, the side sheets 51, 52 and the back surface layer 3, other than in the portion where the hook tape 7 is arranged. The hook tape 7 is arranged on an edge side of the first edge portion 11. As a result, as shown in FIGS. 2 and 6, a low rigidity area 16 is formed on the second end portion 12 side of the portion in which the hook tape 7 is arranged in the first end portion 11; bending rigidity of the low rigidity area 16 is lower than that of the portion in which the hook tape 7 is arranged in the first end portion 11, and that of the portion in which the absorbent core 4 is arranged in the absorbent article for pet 1.

As shown in FIGS. 2 and 6, the length L1 of the low rigidity area 16 along the longitudinal direction LD of the absorbent article for pet 1 is configured to be longer than the width L2 of the hook tape 7.

From a viewpoint of enabling the portion in which the hook tape 7 is arranged in the first end portion 11 to be easily folded back, it is preferable for the bending resistance, with regard to the bending rigidity of the low rigidity area 16 in the longitudinal direction LD, to be 60 mm to 90 mm, which is measured with a bending resistance method B (heart loop method) as defined in L1084 (testing method for flocked fabrics).

The loop member 8 is arranged on an inner surface of the second end portion 12, as shown in FIGS. 1 and 2. The loop member 8 is configured in a belt-like shape and arranged such that the longitudinal direction of the loop member 8 is along the width direction WD of the absorbent article for pet 1. As shown in FIG. 5, the loop member 8 includes a belt-like base portion 81 and a plurality of loop portions 82 provided on one surface of the base portion 81. The loop member 8 is attached to the top sheet 2 and the side sheets 51, 52 such that the surface, on which the plurality of loop members 82 are formed, is an inner surface of the absorbent article for pet 1.

In the loop member 8, the base portion 81 and the plurality of loop portions 82 are integrally formed with a synthetic resin material such as polyethylene.

In the above-described absorbent article for pet 1, the first elastic member 61 in the extended state is fixed to the pair of side sheets 51, 52 along the longitudinal direction LD of the absorbent article for pet 1. In addition, the second elastic members 62 in the extended state are fixed between the side sheets 51, 52 and the back sheet 31, along the longitudinal direction LD of the absorbent article for pet 1.

Given this, the absorbent article for pet 1 in a natural state (without external force applied) has a solid shape as shown in FIG. 1, with the first elastic member 61 and the second elastic members 62 being contracted to thereby bring the first end portion 11 and the second end portion 12 close to each other, with the top sheet 2 side composing an inner surface. A pair of waist gather portions 13 being stretchable in the longitudinal direction LD is thus formed in the pair of side portions of the absorbent article for pet 1 (see FIG. 1). Free end sides of the pair of side sheets 51, 52 are raised to form a pair of pocket portions 14, 15 between the inner surface of the side sheets 51, 52 and the outer surface of the top sheet 2.

Figure 7:
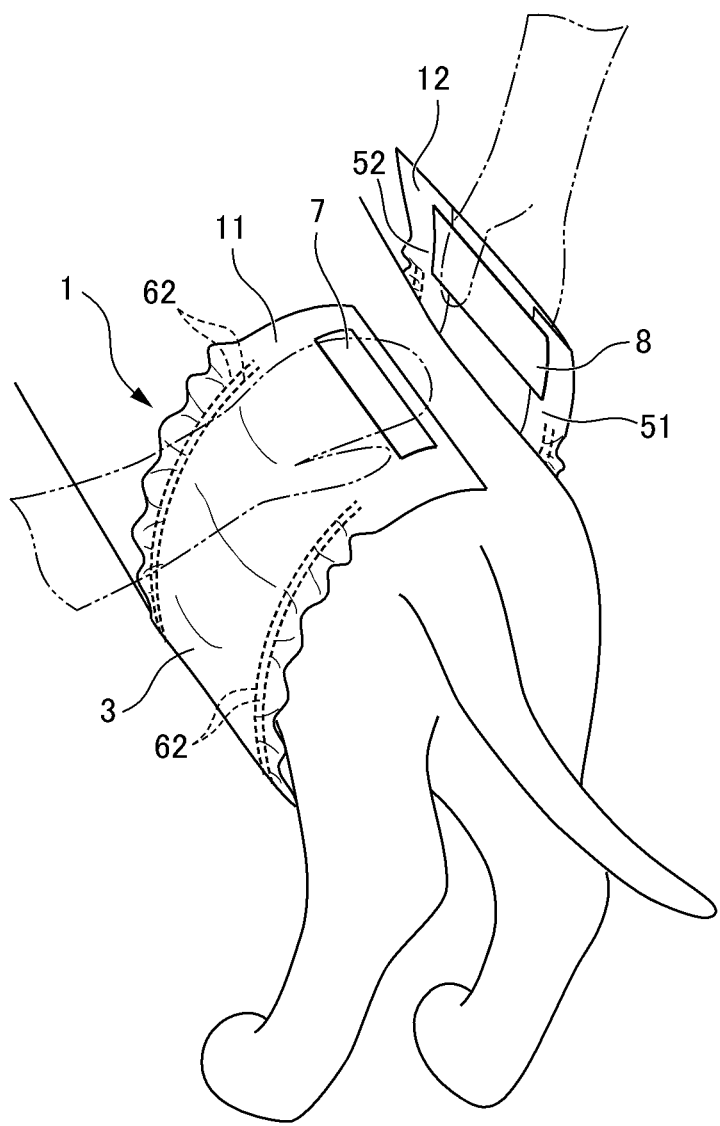
FIG. 7 is a diagram illustrating a process of putting the absorbent article for pet on a pet, in which the first end portion is placed on the pet's back.
Figure 8:
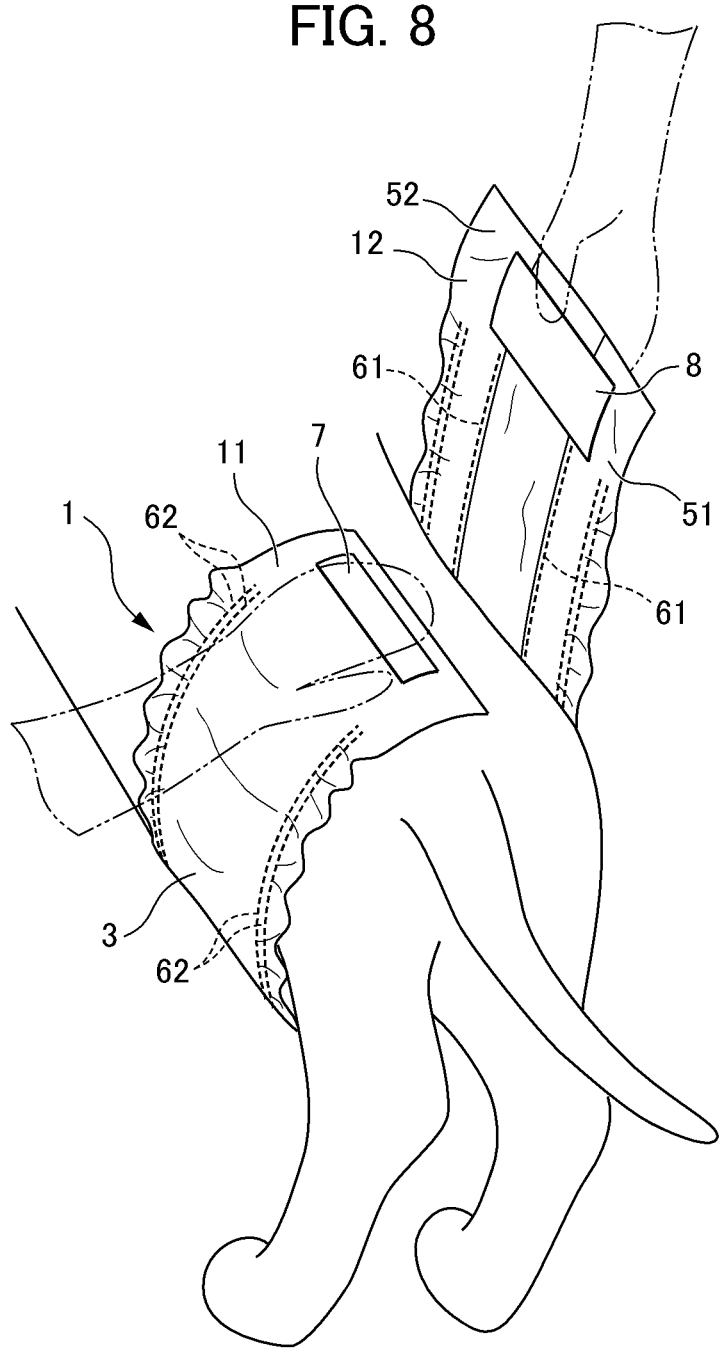
FIG. 8 is a diagram illustrating a process of putting the absorbent article for pet on a pet, in which the second end portion of the absorbent article for pet wrapped around the waist of the pet is pulled to bring the absorbent article for pet into close contact with the waist of the pet.
Figure 9:
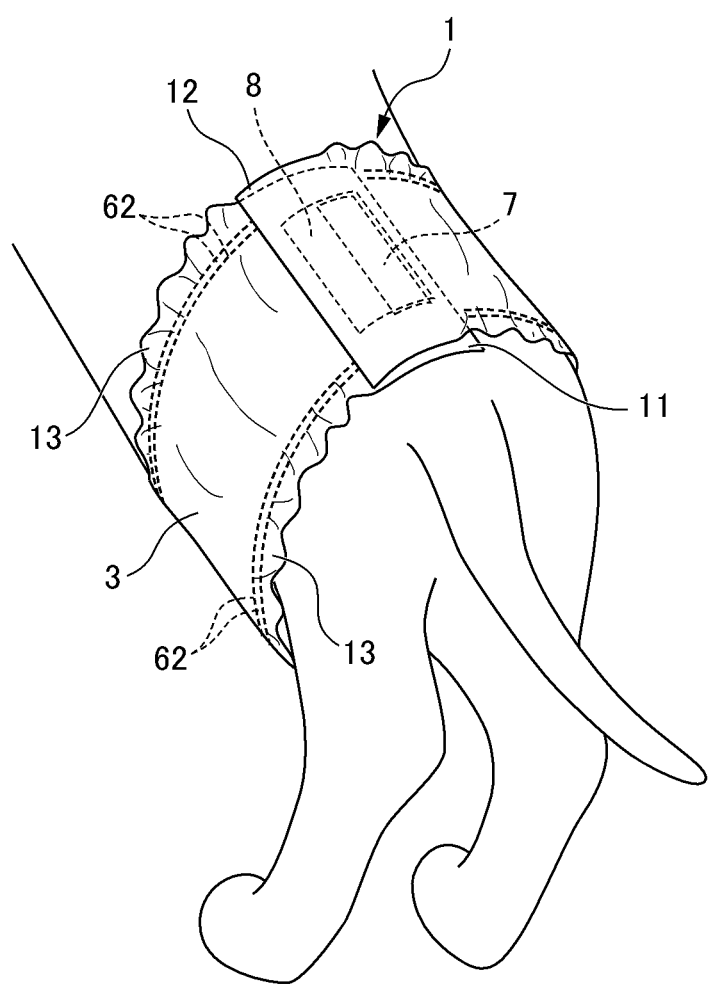
FIG. 9 is a diagram illustrating a state where the absorbent article for pet is put around the pet's waist.

Next, steps of putting on the absorbent article for pet 1 according to the first embodiment to a pet will be described with reference to FIGS. 7 to 9. FIGS. 7 to 9 are diagrams illustrating a process of putting the absorbent article for pet 1 on a pet. FIG. 7 is a diagram illustrating a state where the first end portion 11 is placed on the pet's back. FIG. 8 is a diagram illustrating a process of putting the absorbent article for pet 1 on a pet, in which the second end portion 12 of the absorbent article for pet 1 wrapped around the waist of the pet is pulled to bring the absorbent article for pet 1 into close contact with the waist of the pet; and FIG. 9 is a diagram illustrating a state where the absorbent article for pet 1 is put on the pet's waist.

First, as shown in FIG. 7, the first end portion 11 of the absorbent article for pet 1 is placed on the pet's back, and the first end portion 11 is held by one hand of a user.

Next, in a state where the first end portion 11 is held by one hand, the second end portion 12 of the absorbent article for pet 1 is held by the other hand and wrapped around the pet's body to cover the pet's abdomen.

Next, as shown in FIG. 8, the second end portion 12 is pulled upward and the pair of waist gather portions 13 is brought into close contact with the pet's waist; thereafter, as shown in FIG. 9, the inner surface of the second end portion 12 is engaged with the hook tape 7 provided on the outer surface of the first end portion 11. The absorbent article for pet 1 is thus wrapped around the pet's waist.

Figure 10A:
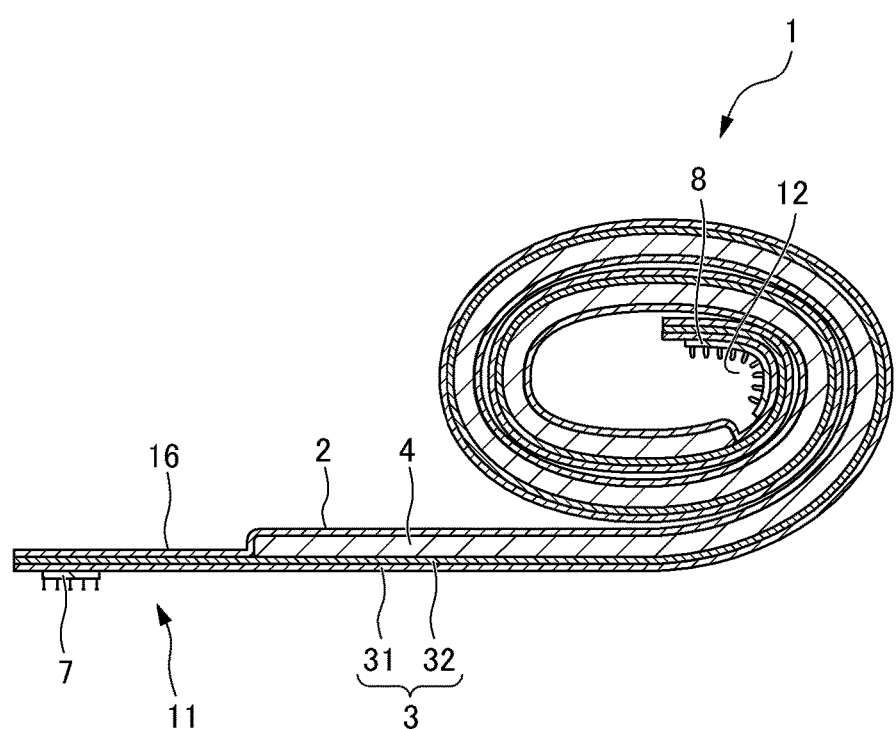
FIG. 10A is a longitudinal sectional view illustrating a state where the absorbent article for pet of the first embodiment is wrapped up from the second end portion side such that the top sheet side is an inner surface.
Figure 10B:
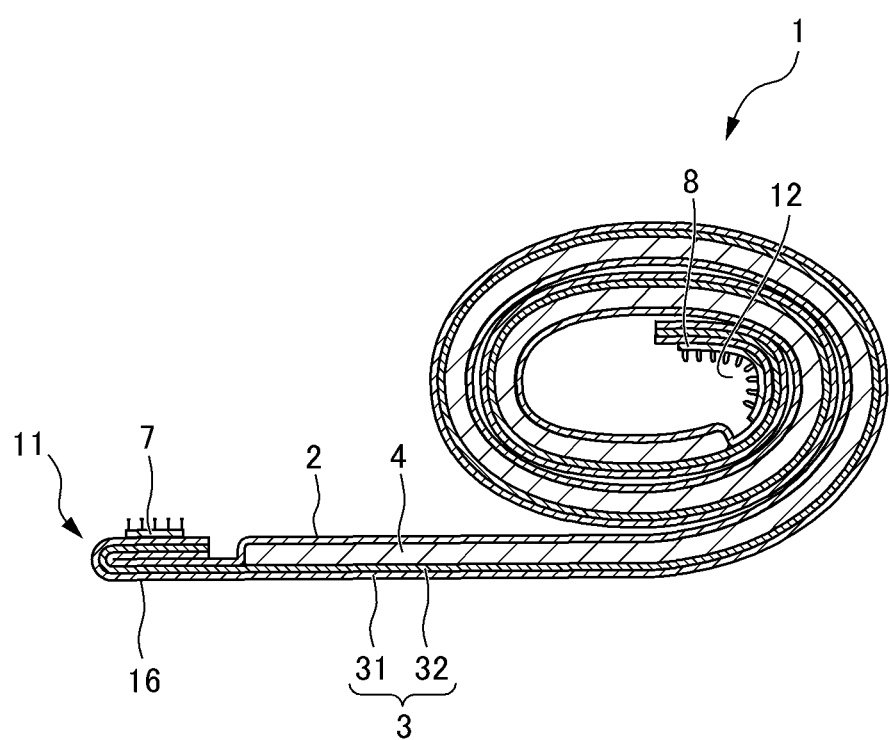
FIG. 10B is a diagram illustrating a state where a portion in which a hook tape is arranged in the first end portion is folded back, from the state shown in FIG. 10A.
Figure 10C:
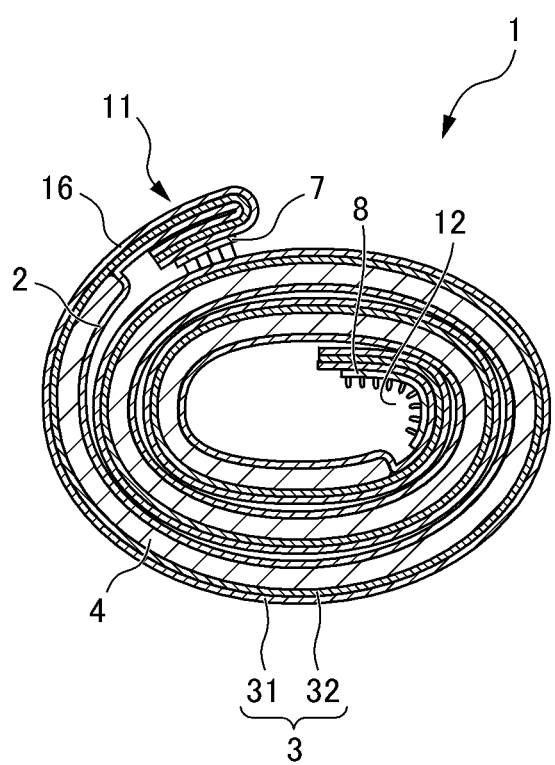
FIG. 10C is a diagram illustrating a state where the absorbent article for pet is further wrapped up to engage the hook tape with a back sheet, from the state shown in FIG. 10B.

Next, steps of disposing of the absorbent article for pet 1 after use are described with reference to FIGS. 6 and 10A to 10C. FIG. 10A is a longitudinal sectional view illustrating a state where the absorbent article for pet 1 of the first embodiment is wrapped up from the second end portion 12 side such that the top sheet 2 side is an inner surface. FIG. 10B is a diagram illustrating a state where the portion in which the hook tape 7 is arranged in the first end portion 11 is folded back from the state shown in FIG. 10A. FIG. 10C is a diagram illustrating a state where the absorbent article for pet 1 is further wrapped up to engage the hook tape 7 with the back sheet 31 from the state shown in FIG. 10B.

After the absorbent article for pet 1 is used, waste such as feces or urine of the pet is attached to the top sheet 2. Here, the absorbent article for pet 1 of the first embodiment is configured in a belt-like shape. Therefore, the top sheet 2 side with attached waste can be prevented from being exposed by wrapping up the absorbent article for pet 1 into a small size in the longitudinal direction such that the top sheet 2 side is inward.

More specifically, first, the absorbent article for pet 1 in a state of being extended like a belt as shown in FIG. 6 is wrapped up by being repeatedly folded back by a predetermined width from the second end portion 12 side such that the top sheet 2 side is inward as shown in FIG. 10A.

Subsequently, when the absorbent article for pet 1 is wrapped up as far as the vicinity of the first end portion 11, the portion in which the hook tape 7 is arranged in the first end portion 11 is folded back such that the hook tape 7 is located on the top sheet 2 side, as shown in FIG. 10B.

Here, the low rigidity area 16 is formed on the second end portion 12 side in the portion in which the hook tape 7 is arranged in the first end portion 11 (see FIG. 10A); therefore, the portion in which the hook tape 7 is arranged can be easily folded back. The length L1 of the low rigidity area 16 along the longitudinal direction LD of the absorbent article for pet 1 is configured to be longer than the width L2 of the hook tape 7. Therefore, in the state where the hook tape 7 is folded back, the entire area overlapping with the hook tape 7 is constituted of the low rigidity area 16, and the absorbent core 4 is not arranged in the area overlapping with the hook tape 7.

Subsequently, in the state where the hook tape 7 of the first end portion 11 is folded back, the absorbent article for pet 1 is further wrapped up from the second end portion 12 side. Then, as shown in FIG. 10C, the folded back hook tape 7 abuts the back sheet 31. Here, since the back sheet 31 is constituted of a nonwoven fabric with which the hook member 72 can be engaged, the hook tape 7 is engaged with the abutted portion of the back sheet 31. As a result, the absorbent article for pet 1 is maintained in the wrapped up state such that the top sheet 2 side is directed inward. The absorbent article for pet 1 is thus disposed of in a state of being wrapped up into a small size.

The above-described absorbent article for pet 1 according to the first embodiment provides the following operational effects.

(1) The hook tape 7 is arranged on the edge side on the outer surface of the first end portion 11, and the low rigidity area 16 is formed on the second end portion 12 side in the portion in which the hook tape 7 is arranged in the first end portion 11. The back sheet 31 is constituted of a nonwoven fabric with which the hook member 72 can be engaged. As a result, the portion in which the hook tape 7 is arranged in the first end portion 11 can be easily folded back such that the hook tape 7 is located on the top sheet 2 side. Therefore, when the absorbent article for pet 1 after use is wrapped up from the second end portion 12 side such that the top sheet 2 side is the inner surface, the absorbent article for pet 1 can be maintained in the wrapped up state without newly providing a separate member, by folding back the portion in which the hook tape 7 is arranged in the first end portion 11 to be engaged with the back sheet 31 of the wrapped up absorbent article for pet 1

(2) The hook tape 7 is configured in a belt-like shape and arranged such that the longitudinal direction of the hook tape 7 is along the width direction WD of the absorbent article for pet 1. As a result, the hook tape 7 is engaged with the back sheet 31 over a wide range of the width direction WD in a case of wrapping up the absorbent article for pet 1; therefore, the retentivity of the state in which the absorbent article for pet 1 is wrapped up can be improved.

(3) The first end portion 11 is configured by extending the top sheet 2, the back surface layer 3 and the side sheets 51, 52, from the edge of the absorbent core 4 in the longitudinal direction; and the low rigidity area 16 is constituted of a portion extending the top sheet 2, the back surface layer 3 and the side sheets 51, 52, from the edge of the absorbent core 4. As a result, the low rigidity area 16 can be mainly constituted of a sheet member having low rigidity; therefore, the portion in which the hook tape 7 is arranged in the first end portion 11 can be easily folded back.

(4) The absorbent core 4 expands and increases in thickness when fluid such as urine is absorbed. Accordingly, the length L1 of the low rigidity area 16 along the longitudinal direction LD of the absorbent article for pet 1 is made greater than the length L2 of the hook tape 7 along the longitudinal direction LD of the absorbent article for pet 1. As a result, in the state where the hook tape 7 is folded back, the entire area overlapping with the hook tape 7 is constituted of the low rigidity area 16 in which the absorbent core 4 is not arranged. Therefore, since the absorbent core 4 is not arranged in the position overlapping with the folded back hook tape 7, even if the absorbent core 4 expands by absorbing fluid, the expanded absorbent core 4 does not affect the hook tape 7. As a result, even if the absorbent core 4 expands in a state where the absorbent article for pet 1 is wrapped up, the engagement of the hook tape 7 with the back sheet 31 is not easily undone.

(5) The locking member is constituted of the hook tape 7, and the back sheet 31 is constituted of a nonwoven fabric with which the hook member 72 can be engaged. As a result, when the absorbent article for pet 1 is disposed of after use, the hook tape 7 can be engaged with the back sheet 31 without providing a separate member for engaging the hook tape 7 with the back sheet 31 side. Therefore, the cost of manufacturing the absorbent article for pet 1 can be reduced.

Figure 11A:
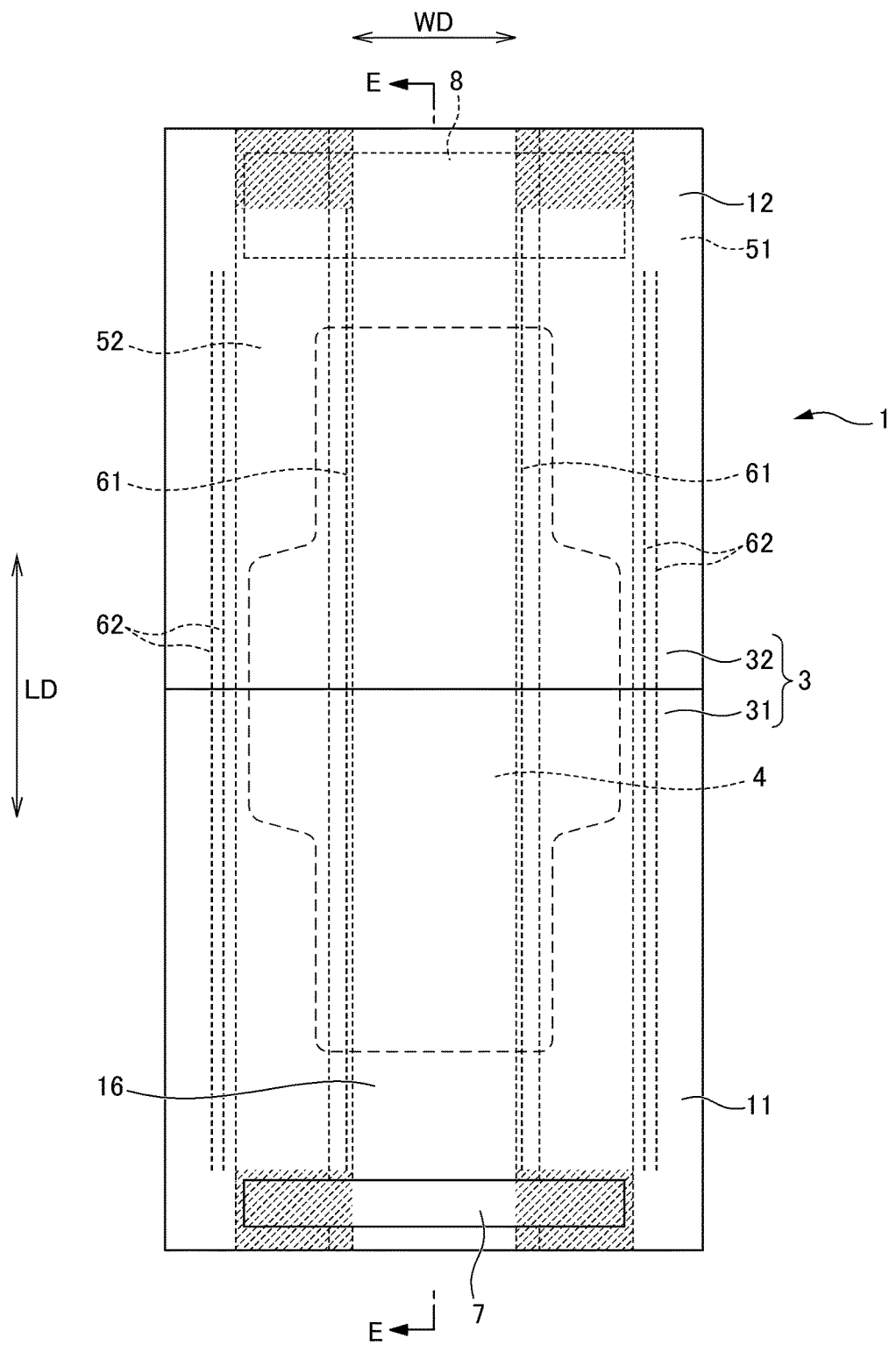
FIG. 11A is a plan view of an absorbent article for pet according to a second embodiment viewed from a back surface layer side.
Figure 11B:
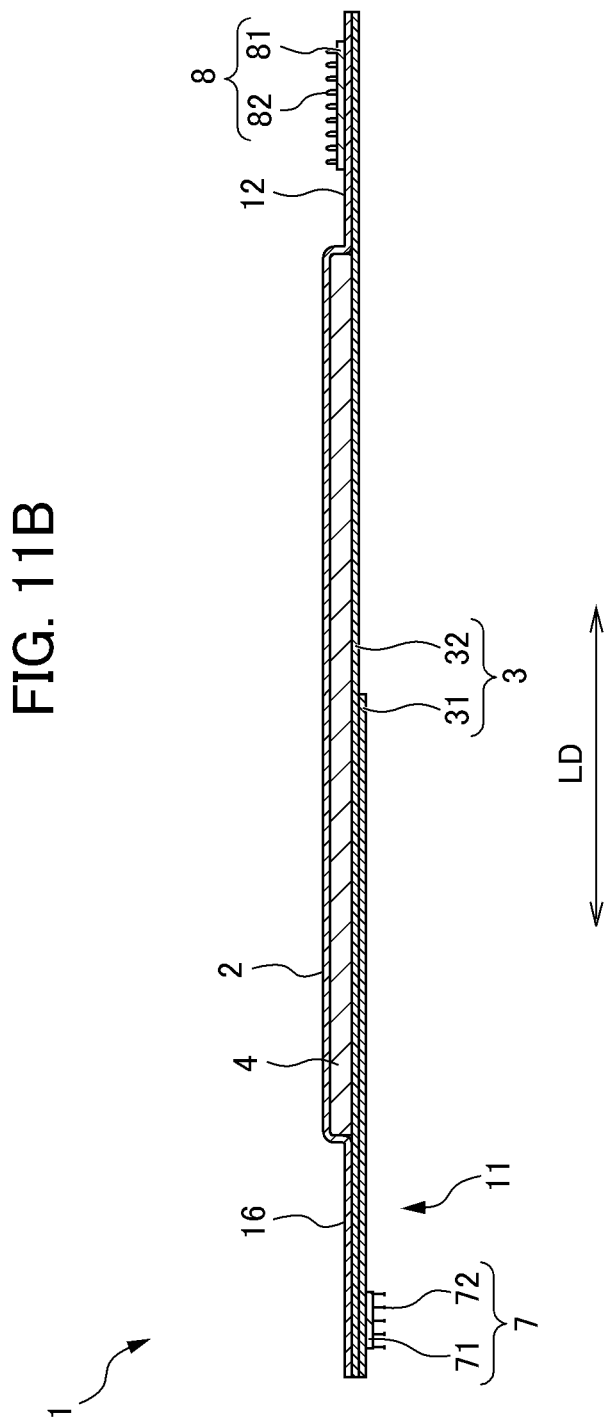
FIG. 11B is a cross-sectional view taken along the line E-E of FIG. 11A.
Figure 11C:
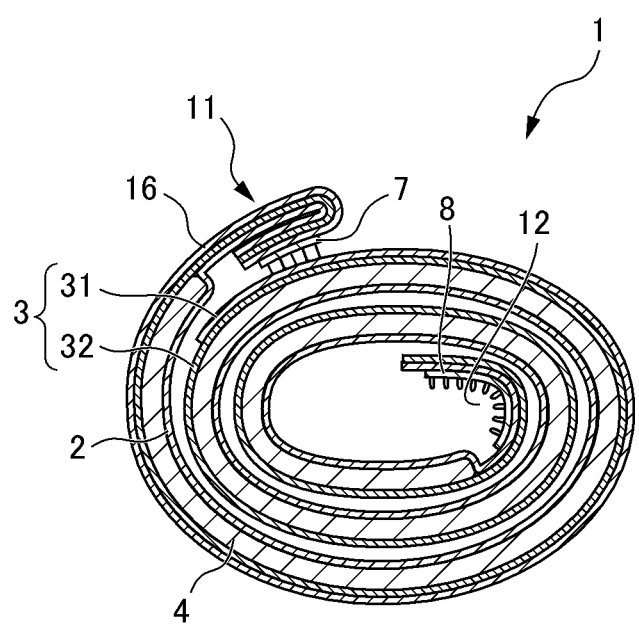
FIG. 11C is a longitudinal sectional view illustrating a state where the absorbent article for pet of the second embodiment is wrapped up.

Next, an absorbent article for pet 1 according to a second embodiment will be described with reference to FIGS. 11A to 11C. FIG. 11A is a plan view of the absorbent article for pet 1 according to the second embodiment viewed from a back surface layer 3 side. FIG. 11B is a cross-sectional view taken along the line E-E of FIG. 11A. FIG. 11C is a longitudinal sectional view illustrating a state where the absorbent article for pet 1 of the second embodiment is wrapped up.

In the description of the following embodiments, the same constituent features are referred by the same reference numerals and a description thereof is omitted or simplified.

The absorbent article for pet 1 according to the second embodiment is different from the first embodiment mainly in the configuration of the back surface layer 3.

More specifically, as shown in FIGS. 11A and 11B, in the second embodiment, the back sheet 31 is arranged only in an area on the first end portion 11 side from the center of the absorbent article for pet 1 in the longitudinal direction LD. In other words, a waterproof sheet 32 is arranged on the entirety of the outer surface side of the absorbent article for pet 1, and the back sheet 31 covers half the area of the waterproof sheet 32 on the first end portion 11 side.

The absorbent article for pet 1 according to the second embodiment provides the following operational effects, in addition to the above operational effects (1) to (5).

(6) In a case in which the absorbent article for pet 1 is wrapped up after use, as shown in FIG. 11C, the back sheet 31 for engaging with the hook tape 7 is positioned in the area on the first end portion 11 side from the center of the absorbent article for pet 1 in the longitudinal direction LD. Accordingly, the back sheet 31, which is arranged on the outer surface side of the back surface layer 3, is arranged in the area on the first end portion 11 side from the center of the absorbent article for pet 1 in the longitudinal direction LD. As a result, the state where the absorbent article for pet 1 is wrapped up after use can be preferably maintained, while reducing the back sheet 31 usage amount.

Figure 12A:
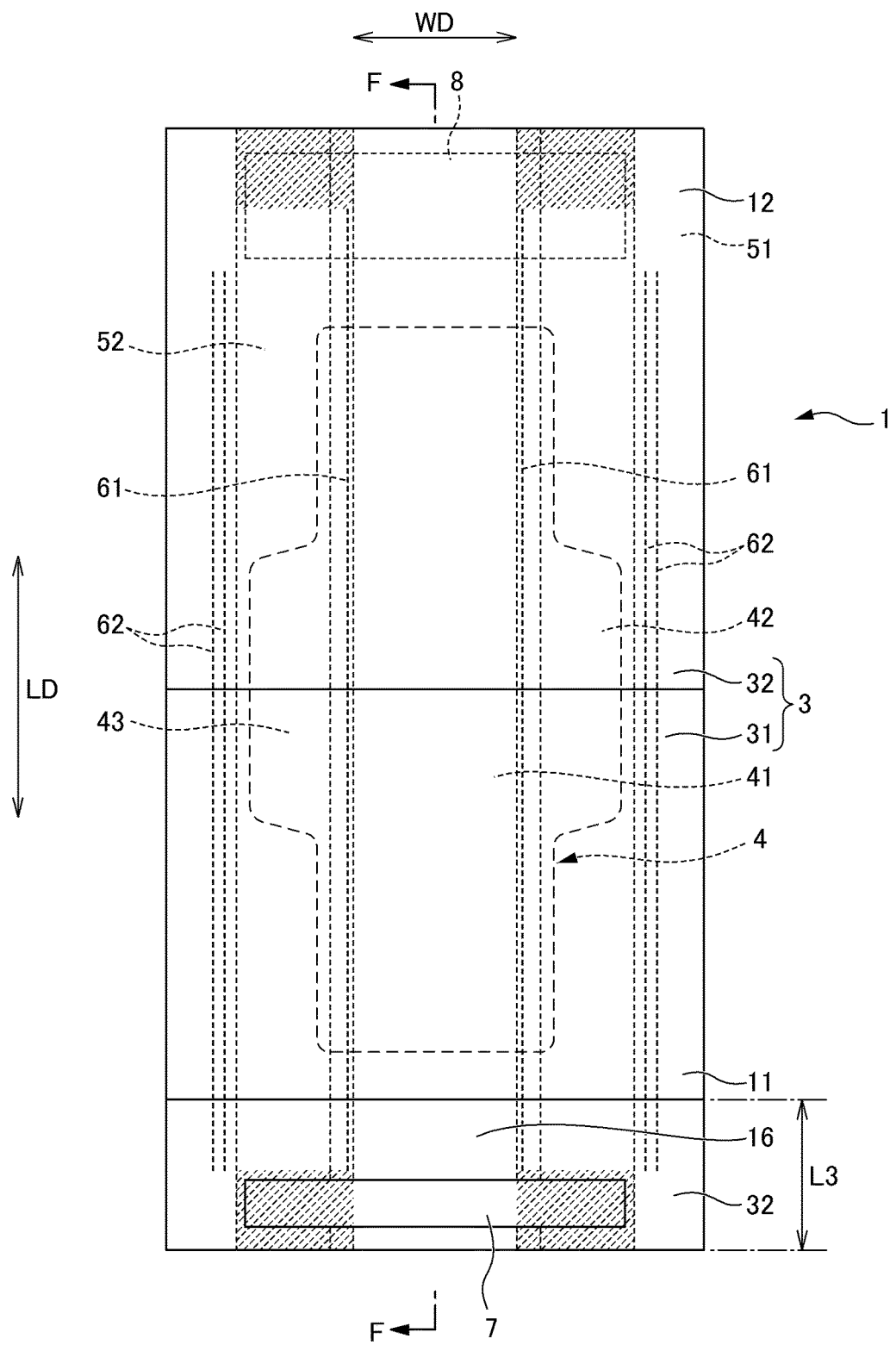
FIG. 12A is a plan view of an absorbent article for pet according to a third embodiment viewed from a back surface layer side.
Figure 12B:
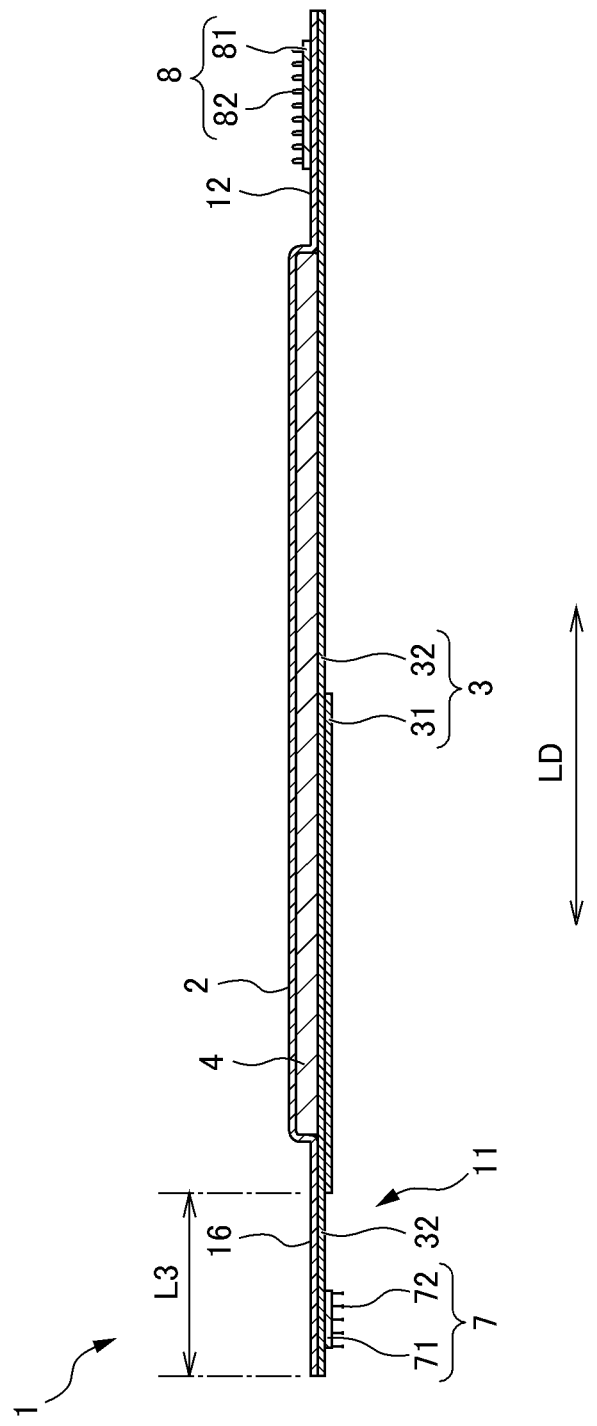
FIG. 12B is a cross-sectional view taken along the line F-F of FIG. 12A.
Figure 12C:
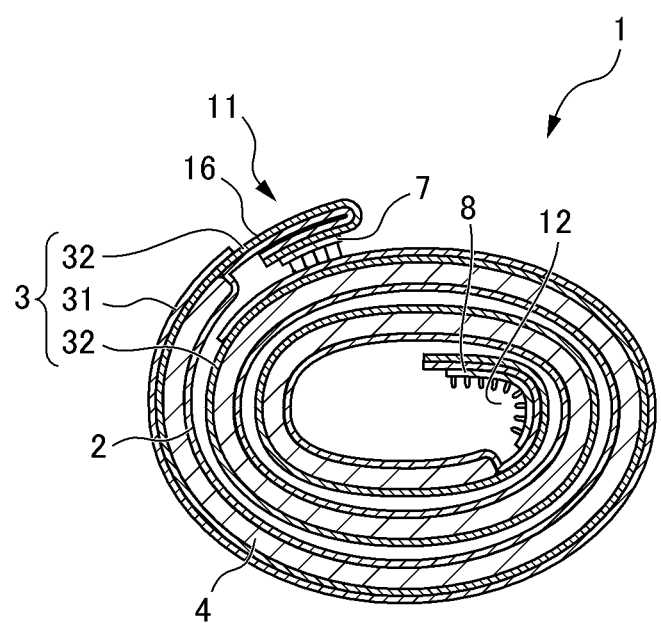
FIG. 12C is a longitudinal sectional view illustrating a state where the absorbent article for pet of the third embodiment is wrapped up.

Next, an absorbent article for pet 1 according to a third embodiment will be described with reference to FIGS. 12A to 12C. FIG. 12A is a plan view of the absorbent article for pet 1 according to the third embodiment viewed from a back surface layer 3 side. FIG. 12B is a cross-sectional view taken along the line E-E of FIG. 12A. FIG. 12C is a longitudinal sectional view illustrating a state where the absorbent article for pet 1 of the second embodiment is wrapped up.

The absorbent article for pet 1 according to the third embodiment is different from the second embodiment mainly in the configuration of the back surface layer 3.

More specifically, as shown in FIGS. 12A and 12B, in the third embodiment, the back sheet 31 is not arranged in an area within a predetermined length L3 from an edge of the first end portion 11 side. In other words, the back sheet 31 is arranged in an area on the first end portion 11 side from the center of the absorbent article for pet 1 in the longitudinal direction LD, other than the area within the predetermined length L3 from the edge of the first end portion 11 side. The hook tape 7 is arranged in an area of the first end portion 11 where the back sheet 31 is not arranged.

According to the absorbent article for pet 1, as shown in FIGS. 12A and 12B, the low rigidity area 16 is formed on the second end portion 12 side in the portion in which the hook tape 7 is arranged in the first end portion 11, in which the low rigidity area 16 does not include the back sheet 31 (the low rigidity area 16 mainly constituted of the top sheet 2 and the waterproof sheet 32).

The absorbent article for pet 1 according to the third embodiment provides the following operational effects, in addition to the above operational effects (1) to (6).

(7) The back sheet 31 is arranged in an area on the first end portion 11 side from the center of the absorbent article for pet 1 in the longitudinal direction LD, other than the area within the predetermined length L3 from the edge of the first end portion 11 side. The hook tape 7 is arranged in the area of the first end portion 11 where the back sheet 31 is not arranged. As a result, the low rigidity area 16 without including the back sheet 31 can be formed on the second end portion 12 side in the portion in which the hook tape 7 is arranged in the first end portion 11. Therefore, since the low rigidity area 16 can be configured to have low bending rigidity, the hook tape 7 can be folded back more easily.

The preferred embodiments of the present invention have been described above; however, the present invention is not limited thereto and can be modified as appropriate.

For example, in the first to third embodiments, the hook tape 7 is arranged on the outer surface of the first end portion 11, the loop member 8 is arranged on the inner surface of the second end portion 12, and the hook tape 7 is engaged with the loop member 8; however, the present invention is not limited thereto. Namely, the top sheet and the side sheets may be constituted of a nonwoven fabric with which the hook member can be engaged, and the inner surface of the second end portion 12 may be constituted of the top sheet and the side sheets. As a result, the absorbent article for pet 1 can be manufactured without using a loop member; therefore, the cost of manufacturing the absorbent article for pet 1 can be reduced.

In the first to third embodiments, the hook tape 7 is used as a locking member; however, the present invention is not limited thereto. Namely, an adhesive tape may be used as a locking member. In this case, the outer surface of the back surface layer may be constituted of a film material that cannot be engaged with the hook member.

Furthermore, in the first to third embodiments, the back surface layer 3 is constituted of two layers: the back surface sheet 31 and the waterproof sheet 32; however, the present invention is not limited thereto. Namely, the back surface layer may be constituted of only the back sheet that is constituted of a nonwoven fabric. The back surface layer may be constituted of the back sheet and the loop member arranged in the portion engaged with the hook tape on the outer surface of the back sheet. Furthermore, the back surface layer may be constituted of the waterproof sheet and the loop member arranged in the portion engaged with the hook tape on the outer surface of the waterproof sheet.

The invention claimed is:

1. An absorbent article for pet, comprising:
a liquid permeable top surface layer;
a liquid impermeable back surface layer; and
an absorbent core positioned between the top surface layer and the back surface layer; wherein the absorbent article for pet is configured in a rectangular shape having a first end portion and a second end portion opposed to each other, the first end portion and the second end portion each having an edge extending in a width direction of the absorbent article, and a pair of side portions opposed to each other and orthogonal to the first end portion and the second end portion, and wherein, in a state of being wrapped around a pet's waist, the first end portion is arranged on a side to the pet's body, and the second end portion is removably attached to an outer surface of the first end portion,
the absorbent article for pet further comprising:
a locking member being arranged on an outer surface side of the first end portion, and being capable of locking an inner surface of the second end portion, the locking member having an elongated shape disposed along the width direction of the absorbent article for pet,
wherein at least a part of an outer surface of the back surface layer is constituted of a member that can be locked by the locking member,
wherein a low rigidity area is formed on a second end portion side in a portion in which the locking member is arranged in the first end portion, rigidity of the low rigidity area being lower than that of the portion in which the locking member is arranged,
wherein the first end portion is configured by extending the top surface layer and the back surface layer from an end of the absorbent core,
wherein the low rigidity area is constituted of a portion in which the top surface layer and the back surface layer are extended from the end of the absorbent core, and an area at an inner side of the first end portion from the end of the absorbent core to the edge of the first end portion is formed of the top surface layer and a length between the end of the absorbent core to an adjacent end of the locking member at the first end portion is longer than a length of the locking member along a longitudinal direction of the absorbent article for pet, so that the top surface layer faces itself and coheres directly with each other when the first end portion is folded inwardly,
the edge of the second end portion extends from one end to another end in the width direction without being interrupted by a tab,
each edge of the first end portion and the second end portion has a width that extends continuously across the absorbent pad that is substantially the same as a width at a longitudinal center of the absorbent core
a length of the locking member along the width direction of the absorbent article for pet is substantially the same as a length of the absorbent core along the width direction of the absorbent article for pet.

2. The absorbent article for pet according to claim 1, wherein the locking member is configured in a belt-like shape, and is arranged such that a longitudinal direction of the locking member is along a width direction of the absorbent article for pet.

3. The absorbent article for pet according to claim 2, wherein length of the low rigidity area along a longitudinal direction of the absorbent article for pet is greater than length of the locking member along the longitudinal direction of the absorbent article for pet.

4. The absorbent article for pet according to claim 3, wherein the locking member is constituted of a hook tape having a plurality of hook members, and
wherein the outer surface of the back surface layer is constituted of a nonwoven fabric with which the plurality of hook members can be engaged.

5. The absorbent article for pet according to claim 2, wherein the locking member is constituted of a hook tape having a plurality of hook members, and
wherein the outer surface of the back surface layer is constituted of a nonwoven fabric with which the plurality of hook members can be engaged.

6. The absorbent article for pet according to claim 5, wherein the top surface layer is constituted of a nonwoven fabric with which the plurality of hook members can be engaged.

7. The absorbent article for pet according to claim 1, wherein length of the low rigidity area along a longitudinal direction of the absorbent article for pet is greater than length of the locking member along the longitudinal direction of the absorbent article for pet.

8. The absorbent article for pet according to claim 7, wherein the locking member is constituted of a hook tape having a plurality of hook members, and
wherein the outer surface of the back surface layer is constituted of a nonwoven fabric with which the plurality of hook members can be engaged.

9. The absorbent article for pet according to claim 8, wherein the top surface layer is constituted of a nonwoven fabric with which the plurality of hook members can be engaged.

10. The absorbent article for pet according to claim 1, wherein the locking member is constituted of a hook tape having a plurality of hook members, and
wherein the outer surface of the back surface layer is constituted of a nonwoven fabric with which the plurality of hook members can be engaged.

11. The absorbent article for pet according to claim 10, wherein the top surface layer is constituted of a nonwoven fabric with which the plurality of hook members can be engaged.

12. The absorbent article for pet according to claim 1, wherein the edge of the first end portion extends from one end to another end in the width direction without being interrupted by a tab.

13. An absorbent article for pet, comprising:
a liquid permeable top surface layer;
a liquid impermeable back surface layer; and
an absorbent core positioned between the top surface layer and the back surface layer; wherein the absorbent article for pet is configured in a rectangular shape having a first end portion and a second end portion opposed to each other, the first end portion and the second end portion each having an edge extending in a width direction of the absorbent article, and a pair of side portions opposed to each other and orthogonal to the first end portion and the second end portion, and wherein, in a state of being wrapped around a pet's waist, the first end portion is arranged on a side to the pet's body, and the second end portion is removably attached to an outer surface of the first end portion, the absorbent article for pet further comprising:

a locking member being arranged on an outer surface side of the first end portion, and being capable of locking an inner surface of the second end portion, the locking member having an elongate shape disposed along the width direction of the absorbent article for pet, wherein at least a part of an outer surface of the back surface layer is constituted of a member that can be locked by the locking member, wherein a low rigidity area is formed on a second end portion side in a portion in which the locking member is arranged in the first end portion, rigidity of the low rigidity area being lower than that of the portion in which the locking member is arranged, wherein the first end portion is configured by extending the top surface layer and the back surface layer from an end of the absorbent core, wherein the low rigidity area is constituted of a portion in which the top surface layer and the back surface layer are extended from the end of the absorbent core, and an area at an inner side of the first end portion from the end of the absorbent core to the an end edge of the first end portion is formed of the top surface layer and a length between the end of the absorbent core to an adjacent end of the locking member at the first end portion is longer than a length of the locking member along a longitudinal direction of the absorbent article for pet, so that the top surface layer faces itself and coheres directly with each other when the first end portion is folded inwardly, the edge of the second end portion extends from one end to another end in the width direction and defines a linear terminal end of the overall absorbent article for pet that extends continuously across the entire width direction of the absorbent article for pet, each edge of the first end portion and the second end portion has a width that extends continuously across the absorbent pad that is substantially the same as a width at a longitudinal center of the absorbent core a length of the locking member along the width direction of the absorbent article for pet is substantially the same as a length of the absorbent core along the width direction of the absorbent article for pet.

14. The absorbent article for pet according to claim 13, wherein the edge of the first end portion extends from one end to another end in the width direction and defines a linear terminal end of the overall absorbent article for pet that extends continuously across the entire width direction of the absorbent article for pet.

* * * * *